United States Patent
Lakic et al.

(10) Patent No.: US 12,162,229 B2
(45) Date of Patent: Dec. 10, 2024

(54) SYSTEM AND METHOD FOR PRODUCING MOULDED STRUCTURE

(71) Applicant: JAGUAR LAND ROVER LIMITED, Warwickshire (GB)

(72) Inventors: Alex Lakic, Warwickshire (GB); Pete Kitchen, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 276 days.

(21) Appl. No.: 17/596,930

(22) PCT Filed: Mar. 2, 2020

(86) PCT No.: PCT/EP2020/055419
§ 371 (c)(1),
(2) Date: Dec. 22, 2021

(87) PCT Pub. No.: WO2020/259872
PCT Pub. Date: Dec. 30, 2020

(65) Prior Publication Data
US 2022/0305745 A1    Sep. 29, 2022

(30) Foreign Application Priority Data
Jun. 24, 2019 (GB) .................................. 1909025

(51) Int. Cl.
*B29C 70/54* (2006.01)
*B29C 70/34* (2006.01)
(Continued)

(52) U.S. Cl.
CPC .......... *B29C 70/541* (2013.01); *B29C 70/345* (2013.01); *B29C 70/543* (2013.01); *B29D 99/0014* (2013.01); *B29L 2031/3005* (2013.01)

(58) Field of Classification Search
CPC ... B29C 70/541; B29C 70/345; B29C 70/543; B29C 70/081; B29D 99/0014; B29L 2031/3005
See application file for complete search history.

(56) References Cited

U.S. PATENT DOCUMENTS 5,431,984 A * 7/1995 Keck ..................... B29C 70/543
156/169
6,821,613 B1 * 11/2004 Kagi ....................... B29C 70/86
428/297.4
(Continued)

FOREIGN PATENT DOCUMENTS

EP    2700494 A1    2/2014
EP    3109152 A1    12/2016
(Continued)

OTHER PUBLICATIONS

Great Britain Intellectual Property Office, Combined Search and Examination Report under Sections 17 and 18(3) Issued in Application No. GB1909025.7, Dec. 10, 2019, 7 pages.
(Continued)

*Primary Examiner* — S. Behrooz Ghorishi
(74) *Attorney, Agent, or Firm* — McCoy Russell LLP

(57) ABSTRACT

Embodiments of the present disclosure provide systems and methods for producing a moulded component, for example a component for an automobile, having at least two unidirectional fibre portions. The unidirectional fibre portions are joined together at nodal points in a first step to produce a network of unidirectional fibres with over-moulded nodal points. The network of unidirectional fibres with over-moulded nodal points is then placed in a large mould tool along with a second moulding material. The large mould tool is then closed to produce a part that comprises the network of unidirectional fibres embedded within the second moulding material.

11 Claims, 8 Drawing Sheets

(51) Int. Cl.
*B29D 99/00* (2010.01)
*B29L 31/30* (2006.01)

(56) References Cited

U.S. PATENT DOCUMENTS

| | | | |
|---|---|---|---|
| 2013/0108837 A1 | 5/2013 | Blot | |
| 2013/0280488 A1* | 10/2013 | Flinn | B32B 5/02 |
| | | | 156/247 |
| 2017/0158253 A1* | 6/2017 | Eidmann | B62D 29/046 |
| 2019/0353143 A1* | 11/2019 | Girolamo | B29D 99/0028 |

FOREIGN PATENT DOCUMENTS

| | | | |
|---|---|---|---|
| WO | 9952703 A1 | 10/1999 | |
| WO | 2017099585 A1 | 6/2017 | |

OTHER PUBLICATIONS

ISA European Patent Office, International Search Report and Written Opinion Issued in Application No. PCT/EP2020/055419, Jun. 2, 2020, WIPO, 12 pages.

\* cited by examiner

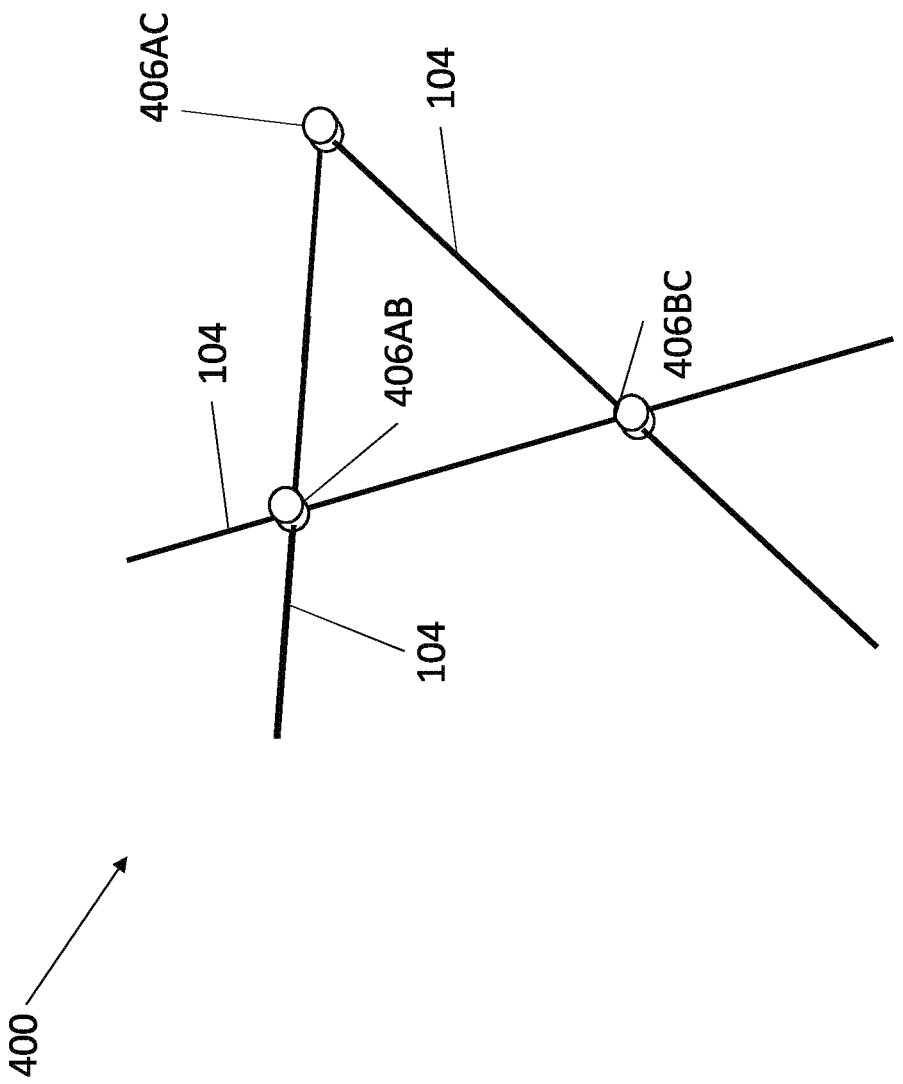

SYSTEM AND METHOD FOR PRODUCING MOULDED STRUCTURE

TECHNICAL FIELD

The present disclosure relates to a system and a method for producing moulded structures. Aspects of the disclosure relate to a method of manufacturing a moulded component, to a moulded component and to a vehicle. Particularly, but not exclusively, the disclosure relates to moulded composite components for vehicles.

CROSS REFERENCE TO RELATED APPLICATIONS

The present application is a U.S. National Phase of International Application No. PCT/EP2020/055419 entitled "SYSTEM AND METHOD FOR PRODUCING MOULDED STRUCTURE," and filed on Mar. 2, 2020. International Application No. PCT/EP2020/055419 claims priority to Great Britain Patent Application No. 1909025.7 filed on Jun. 24, 2019. The entire contents of each of the above-listed applications are hereby incorporated by reference for all purposes.

BACKGROUND AND SUMMARY

It is generally desirable to provide components for motor vehicles having reduced weight whilst maintaining the required mechanical properties such as strength or stiffness, so as to enable the overall mass of vehicles to be reduced. Such a weight reduction can lead to improvements in fuel efficiency, or increased range in the case of plug-in electric vehicles.

Fibre-reinforced plastics have the potential to provide significant weight savings as compared to equivalent metal components, especially if the fibre orientation can be optimised for the expected loading of the component. However, such components can be expensive to produce, especially if large amounts of expensive fibres are required to make the part. Accordingly, it is desirable to provide methods of manufacturing components that enable components with an improved combination of properties to be produced.

It is an object of embodiments of the disclosure to at least mitigate one or more of the problems of the prior art.

Aspects and embodiments of the disclosure provide a method, a moulded component and a vehicle.

According to an aspect of the disclosure for which protection is sought there is provided a method of manufacturing a moulded component having at least two unidirectional fibre portions, said method comprising:
  positioning the at least two unidirectional fibre portions in a network in a jig, wherein said jig is configured to secure the at least two unidirectional fibre portions in a predetermined position such that the unidirectional fibre portions meet or intersect at one or more nodal points;
  over-moulding a first moulding material over the at least two unidirectional fibre portions at the one or more nodal points, thereby forming a network of unidirectional fibres having over-moulded nodal points;
  positioning the network of unidirectional fibres having over-moulded nodal points into a mould tool such that the over-moulded nodal points are located at predetermined locations within the mould tool, wherein said mould tool has at least one recess arranged to receive one of said over-moulded nodal points, thereby to constrain the over-moulded nodal point within the mould tool;
  introducing a second moulding material into the mould tool;
  over-moulding the network of unidirectional fibres having over-moulded nodal points with the second moulding material to form the component. The method may allow parts having an improved combination of properties to be produced. The disclosure may allow parts having an improved combination of strength, stiffness, weight and cost to be produced. The method allows parts having the network of unidirectional fibres embedded within the second moulding material to be produced.

In an embodiment, the step of over-moulding a first moulding material over the at least two unidirectional fibre portions may be performed using a first mould tool, and the steps of positioning the network of unidirectional fibres into a mould tool, introducing a second moulding material into the mould tool and over-moulding the network of unidirectional fibres with the second moulding material to form the component may all be performed using a second mould tool.

In an embodiment the component is a component for an automobile. Optionally, the component comprises an internal panels of an automobile, a component of a body shell of an automobile, a part of a battery casing of an automobile, a part of an automobile sub-frame or a part of an automobile seat.

In an embodiment, each of the at least two unidirectional fibre portions comprises a plurality of intertwined continuous fibres. Such fibres are widely available and have excellent tensile strength and stiffness. Optionally, the intertwined continuous fibres have a diameter in the range from 0 mm-20 mm.

In an embodiment, the first moulding material comprises a plurality of embedded fibres. Optionally, the first moulding material comprises embedded aligned fibres arranged in a plurality of different directions. Further optionally, the embedded aligned fibres are arranged in a cross-weave pattern. This allows the tensile strength of the nodal point to be significantly increased, so that the nodal point may be as strong as or stronger than the aligned fibres.

Optionally, the embedded fibres are aligned in at least four different directions, such that the strength and/or stiffness of the first moulding material is quasi-isotropic in at least one plane. The embedded fibres may be orientated parallel to four principal axes within a single plane, each of said axes being inclined at an angle of approximately 45 degrees to at least one other axis.

In an embodiment, the first moulding material is provided in the form of one or more disks. Optionally, a plurality of disks are provided, and each disk has a plurality of aligned fibres embedded therein, wherein the direction of the aligned fibres in each disk is offset from the direction of the aligned fibres in at least one other disk. This provides a convenient way of moulding a nodal point having quasi-isotropic stiffness in at least one direction.

Optionally, the second moulding material comprises a sheet moulding compound, a metal or metal alloy, a matrix material containing glass fibres, or a mixture thereof.

According to a further aspect of the disclosure for which protection is sought there is provided a moulded component having at least two unidirectional fibre portions, the unidirectional fibre portions meeting at one or more nodal points,
  wherein a majority of the volume of the moulded component is formed from a second moulding material, and wherein the moulded component is formed from a first moulding material in the vicinity of the one or more nodal points.

Optionally, each of the at least two unidirectional fibre portions comprises a plurality of intertwined continuous fibres.

In an embodiment, the intertwined continuous fibres have a diameter in the range from 0 mm-20 mm.

Optionally, the first moulding material comprises a plurality of embedded fibres. Further optionally, the first moulding material comprises embedded aligned fibres arranged in a plurality of different directions. The embedded aligned fibres may be arranged in a cross-weave pattern. The embedded fibres may be aligned in at least four different directions, such that the strength and/or stiffness of the first moulding material is quasi-isotropic in at least one plane.

In an embodiment the embedded fibres are orientated parallel to four principal axes within a single plane, each of said axes being inclined at an angle of approximately 45 degrees to at least one other axis.

In another embodiment, the second moulding material comprises a sheet moulding compound, a metal or metal alloy, a matrix material containing glass fibres, or a mixture thereof.

According to another aspect of the disclosure for which protection is sought, there is provided a moulded component produced according to a method as described above.

According to another aspect of the disclosure for which protection is sought, there is provided a vehicle comprising a moulded component as described above.

Within the scope of this application it is expressly intended that the various aspects, embodiments, examples and alternatives set out in the preceding paragraphs, in the following description and drawings, and the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

Embodiments of the disclosure will now be described by way of example only, with reference to the accompanying figures, in which:

FIG. 4 shows a network of unidirectional fibres for use in a method according to an embodiment of the present disclosure;

DETAILED DESCRIPTION

The present disclosure provides a system and method for producing components that are locally reinforced by unidirectional fibres (which may also be referred to as unidirectional fibre portions). Such unidirectional fibres may be embedded within a polymer matrix, optionally within a matrix comprising a plurality of randomly-aligned short fibres, such as sheet moulding compound (SMC). The unidirectional fibres (UDs) may be solid braids made from carbon fibre or another strong, lightweight fibre such as glass fibre, basalt fibres, or synthetic fibres such as poly paraphenylene terephthalamide fibres.

Such braids may be commercially referred to as "gusset fillers", and are available having diameters up to 20 mm. In the present disclosure, the UDs are typically braids having a diameter of 0.5 mm to 6 mm, although it will be understood that other sizes of braid may be used, or that the UDs may be non-braided.

Throughout the present specification, reference is made to sheet moulding compound (SMC), which comprises a thermoset and a plurality of short, randomly-distributed fibres embedded therein. It will be understood that SMC may comprise various different types of fibre embedded within the thermoset material, and that the most appropriate type of fibre may depend on the specific application. Examples of the type of fibre that may be provided within SMC include carbon fibres, glass fibres and basalt fibres. It should be noted that the short, randomly-aligned fibres within SMC are generally less expensive than unidirectional fibres. Accordingly, it is desirable to only use unidirectional fibres in regions where the strengthening and/or stiffening effect that they provide is actually required.

Figure 1:
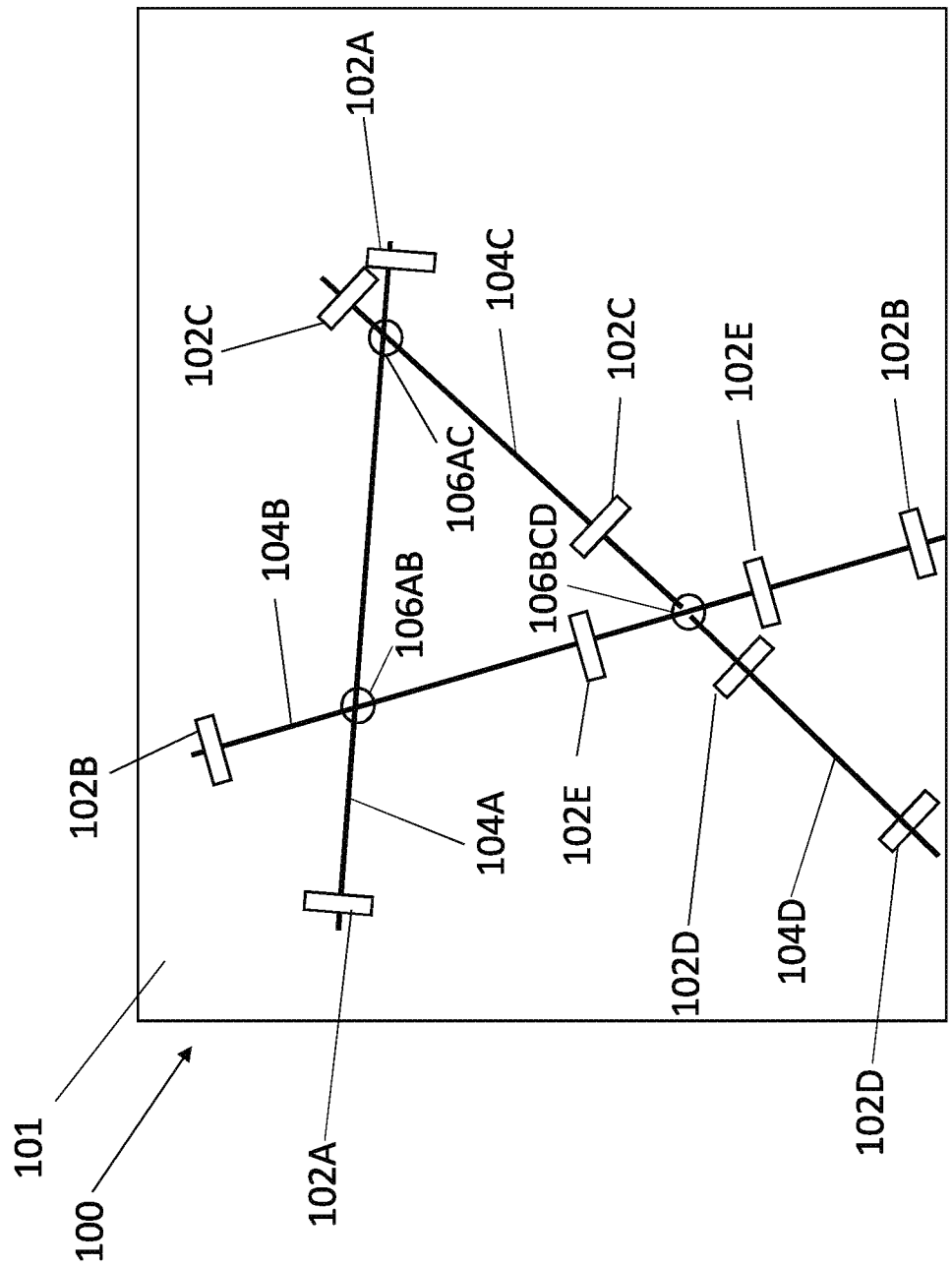
FIG. 1 shows a jig for producing a network of unidirectional fibre portions for use in a method according to an embodiment of the present disclosure.

FIG. 1 shows a jig 100 for use in a method of producing a moulded component according to an embodiment of the present disclosure. In the illustrated embodiment, the jig comprises a flat surface 101 having three recesses 106 disposed at predetermined positions thereon. However, it will be understood that in some embodiments the surface may not be flat, because it may not be possible to provide the required distances between all of the nodal points on a flat surface whilst maintaining all of the fibres under tension.

The jig also comprises three pairs of clamps 102A-E. The pairs of clamps 102A-E are all located at predetermined positions, so that respective unidirectional fibres 104A-D may be each constrained to follow a predetermined path along the surface 101 of the jig by holding a portion of the fibres within each of clamp of the respective pair clamps 102A-C. It should be noted that fibre 104B is held near its ends by clamps 102B, and is also held at a position proximate to nodal point 106BCD by an additional pair of clamps 102E. It will be understood that the fibres 104A-D may be cut to the required length before the ends are held within the clamps, or a longer fibre could be held within the clamps and subsequently cut to the required length. As shown in FIG. 1, it is desirable that the clamps 102 hold the fibres 104A-D at a position near to the end of the fibres, so as to ensure that as small a proportion of the fibre as possible is loose on the surface 101 of the jig.

The recesses 106 are also located at predetermined positions, such that the when fibres 104A-C follow their predetermined paths, a recess is positioned at all of the locations at which the fibres intersect or meet on the surface 101 of the jig 100. For example, recess 106AB is located at the intersection of fibres 104A and 104B, and recess 106BC is located at the intersection of fibres 104B and 104C. Recess 106AC is located at the point where the ends of fibres 104A and 104C meet. Recess 106BCD is located at a point that fibre 104A passes through and at which fibres 104C and 104D end. As will be discussed in more detail below, the positioning of the recesses 106 at the positions where the fibres 104 meet or intersect enables the jig to be used to join the fibres at the points where they meet or intersect, so as to produce a flexible network of unidirectional fibres. The points at which the fibres meet or intersect may also be referred to as "nodal points". Intersections can occur between two, three, four, five or more UD lines at a node. In the simplest form, two straight lines cross over one-another at the intersection. In other forms, some or all of the UD lines may terminate at a node, leaving a gap between a termination and other UD. This has to happen when an odd number of UD lines intersect at a node, but might also be desirable with an even number of intersecting lines in order to avoid crimping, kinking or 'layering misalignment', all of which can have a detrimental effect on stiffness and strength.

Figure 2:
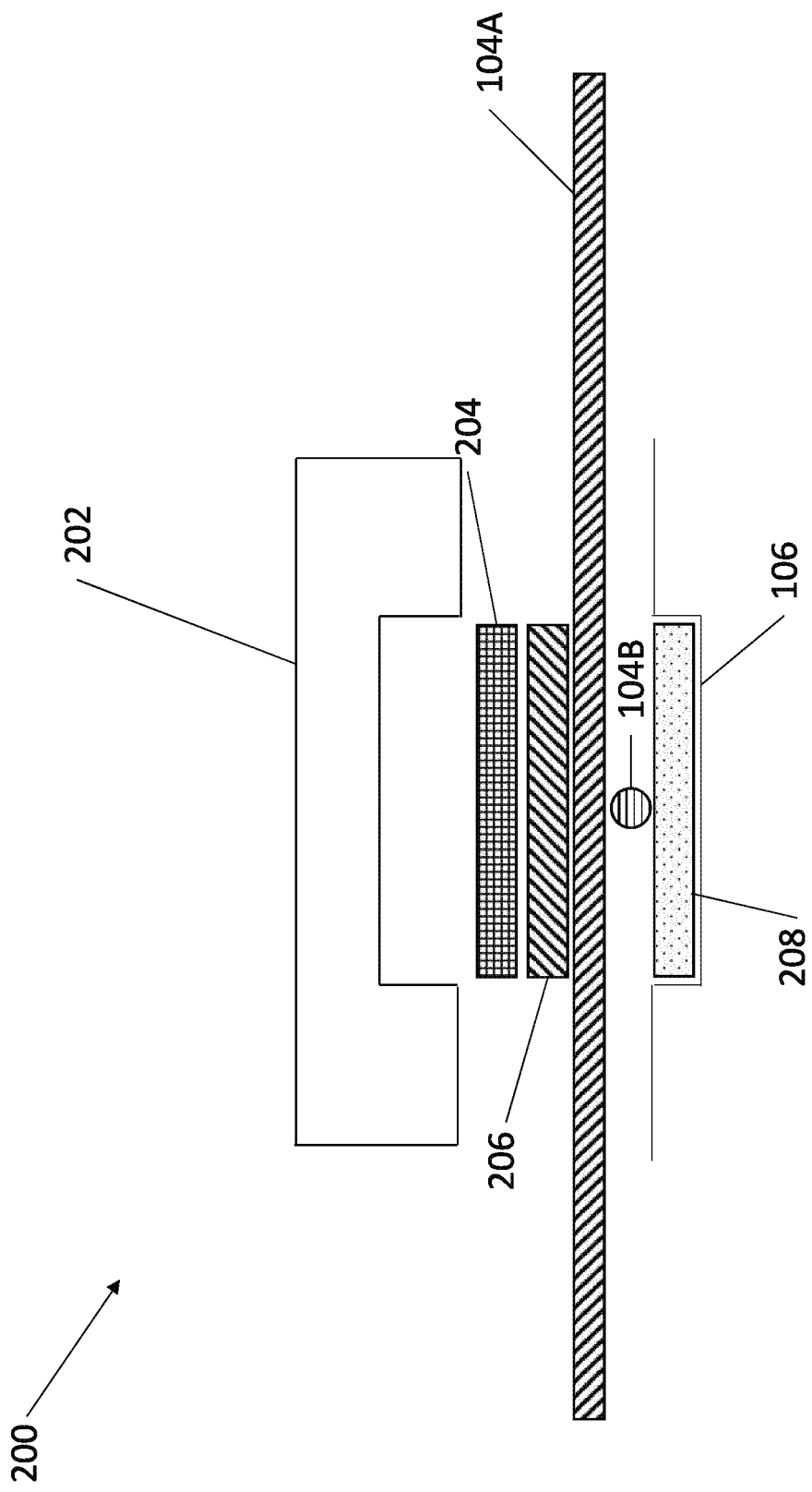
FIG. 2 shows a cross section through a small mould tool for joining unidirectional fibre portions at nodal points.

FIG. 2 shows a small mould tool 200, which may also be referred to as a first mould tool 200, for use in joining the unidirectional fibres 104 at nodal points 106AB, 106AC. The small mould tool 200 comprises an upper mould part 202 arranged to cooperate with one of the recesses 106 in the jig 100 to mould a nodal point around two or more of the fibres 104A-C. In the illustrated embodiment, the upper mould part 202 comprises one or more heating elements (not shown) embedded within the tool. The heating elements can be actuated by a user so as to cause the material within the mould cavity to cure, thereby forming a nodal point. In the illustrated embodiment, the small mould tool 200 is attached to the jig 100 at each recess 106, so that all of the nodal points may be formed simultaneously. However, in some embodiments, the small mould tool may be a separate part from the jig 100, and the small mould tool may be positioned around the fibres at the nodal points without using the recess in the jig as part of the small mould tool. In this case, it will be understood that it would be necessary to provide the mould tool 200 with a lower mould part to cooperate with the upper mould part 202. In either case, the small mould tool is arranged to mould one or more disks of material around two or more unidirectional fibres 104A, 104B, so as to connect the unidirectional fibres at the nodal point. In the embodiment illustrated in FIG. 2, the mould tool combines first and second disks of prepreg material 204, 208, and a disk of sheet moulding compound 206 to form the over-moulded nodal point, as will be discussed in more detail below.

FIG. 2 shows the mould tool 200 located at nodal point 106BCD. As discussed above, fibres 104C and 104D end at nodal point 106BCD, and fibre 104B passes through nodal point 106BCD. As shown in FIG. 1, additional clamps 102E, 102D are required close to the node 106BCD, to ensure that the fibres 104B, 104C, 104D are accurately positioned relative to each other. As discussed above, ending the fibres 104C, 104D at the nodal point ensures that kinking of layering misalignment of the fibres does not occur within the nodal point.

In the embodiment illustrated in FIGS. 1 and 2, the recesses 106 in the jig and the recess in the upper mould part 202 of the small mould tool are both cylindrical, so that the resulting over-moulded nodal points are substantially cylindrical, as can be seen in FIG. 4. However, in some embodiments the recess 106 and/or the upper mould part may have a complex surface, so that the recesses have a corresponding complex surface. This may enable the nodal point to be provided with one or more strengthening ribs, or it may enable the nodal point to provide a protrusion having a desired shape on the outer surface of the final part.

The process of laying the unidirectional fibres on the jig 100 and forming over-moulded nodal points around the unidirectional fibres using the small mould tool 200 will be described in more detail below with reference to FIG. 3.

Figure 3:
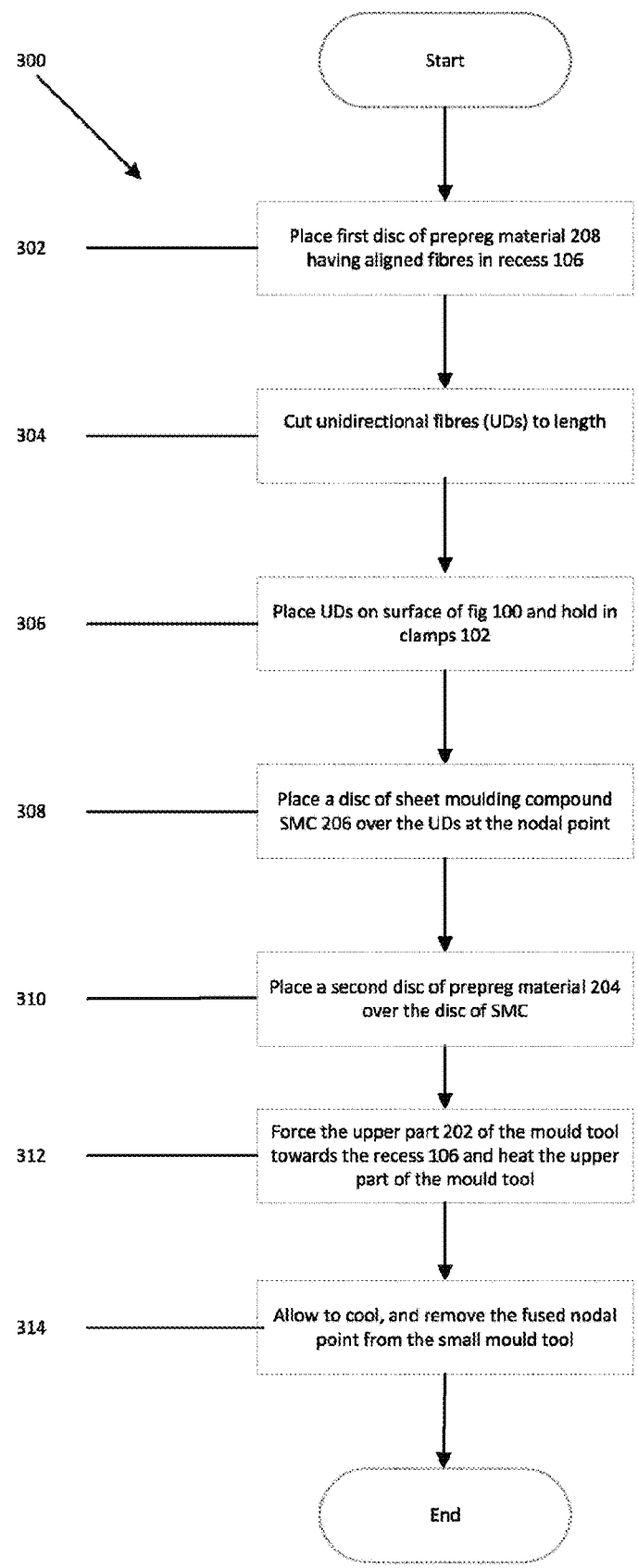
FIG. 3 is a flow chart illustrating a method of connecting unidirectional fibre portions at nodal points.

FIG. 3 shows a method 300 for joining unidirectional fibres (UDs) 104 at nodal points by over-moulding a mould material around the unidirectional fibres. The method begins at step 302, in which a first disk of pre-impregnated (prepreg) material 208, comprising a resin and a plurality of aligned fibres in two mutually perpendicular directions, or several predetermined ply directions at angles to one-another, is placed in the recess 106 underneath the UDs at the nodal point. In step 304 the UDs are cut to the required length. The method then proceeds to step 306, in which the UDs 104 are then placed on the surface of the jig 100, and each UD is held in its required position by a respective pair of clamps 102.

In step 308, a disk of sheet moulding compound 206, comprising a thermoset polymer having a plurality of relatively short, randomly-aligned fibres encased therein is placed over the UDs 104 at the nodal point. The method then proceeds to step 310, in which a second disk of pre-impregnated material 204 is placed over the disk of sheet moulding compound 206. The second disk of pre-impregnated material 204 is identical to the first disk of pre-impregnated material 208, and also comprises aligned fibres in two mutually perpendicular directions encased within a resin. The second disk is orientated such the fibres within it are aligned with those in the first disk.

Provision of fibres aligned in different directions within the nodal point is a significant advantage of the present disclosure, as it allows the strength and/or stiffness of the nodal points to substantially match or exceed that of the UDs. This may be of benefit when one or more of the fibres ends within the nodal point, as a tensile force applied to a fibre ending within the nodal point might otherwise have caused excessive deformation or failure of the nodal point if the strength or stiffness of the nodal point in the direction of the force was significantly lower than the strength or stiffness of the UD. Although the embodiment above uses disks of prepreg material that have fibres aligned in two mutually perpendicular directions, it will be understood that fibres could be provided in more directions. For example, each disk could comprise fibres aligned in four different directions spaced apart by 45 degrees.

Once all of the disks 204, 206, 208 are positioned around the UDs 104A, 104B, the small mould tool 200 is closed in step 312, by forcing the upper mould part 202 towards the recess 106 to compress the disks 204, 206, 208 around the UDs 104A, 104B. The upper mould part 202 is also heated to a sufficiently high temperature to cure the resin within the disks 204, 208 and the thermoset material within the disk 206. Accordingly, the material within the disks fuses around the UDs to over-mould the material in disks 204, 206, 208 around the UDs, thereby producing a nodal point at which the UDs are joined. In step 314, the nodal point and the small mould tool 200 are allowed to cool, and the nodal point is removed from the small mould tool. The material that is over-moulded around the UDs may be referred to collectively as a "first moulding material". It will be understood that the first moulding material is not limited to the disks 204, 206, 208 as described above, and that various other moulding materials could be used in other embodiments. In some embodiments, the first moulding material may be a single, homogenous material, or it may be a combination of different materials.

Although the process shown in FIG. 3 only illustrates the production of a single nodal point, it will be understood that the procedure is the same at each of the other nodal points. Indeed, moulding of each of the nodal points within a single part can be performed substantially simultaneously, so as to reduce the overall amount of time required to produce a part.

When all of the nodal points attaching the unidirectional fibres 104 are formed according to the method illustrated by FIG. 3, the result is a flexible network 400, as shown in FIG. 4. The flexible network 400 shown in FIG. 4 comprises the three unidirectional fibres 104A-C shown in FIG. 1 joined at nodal points 406AB, 406AC, 406BC. In some embodiments, further trimming of the length of the unidirectional fibres 104A-C may be performed after moulding of the nodal points according to the process shown in FIG. 3. Although the embodiment shown in FIG. 3 is for making a flexible network of aligned fibres, it will be understood that in some embodiments the UDs may be pre-impregnated with a resin, which resin may be cured by heat application in addition to the curing of the nodes, so that the network is not flexible.

Figure 5A:
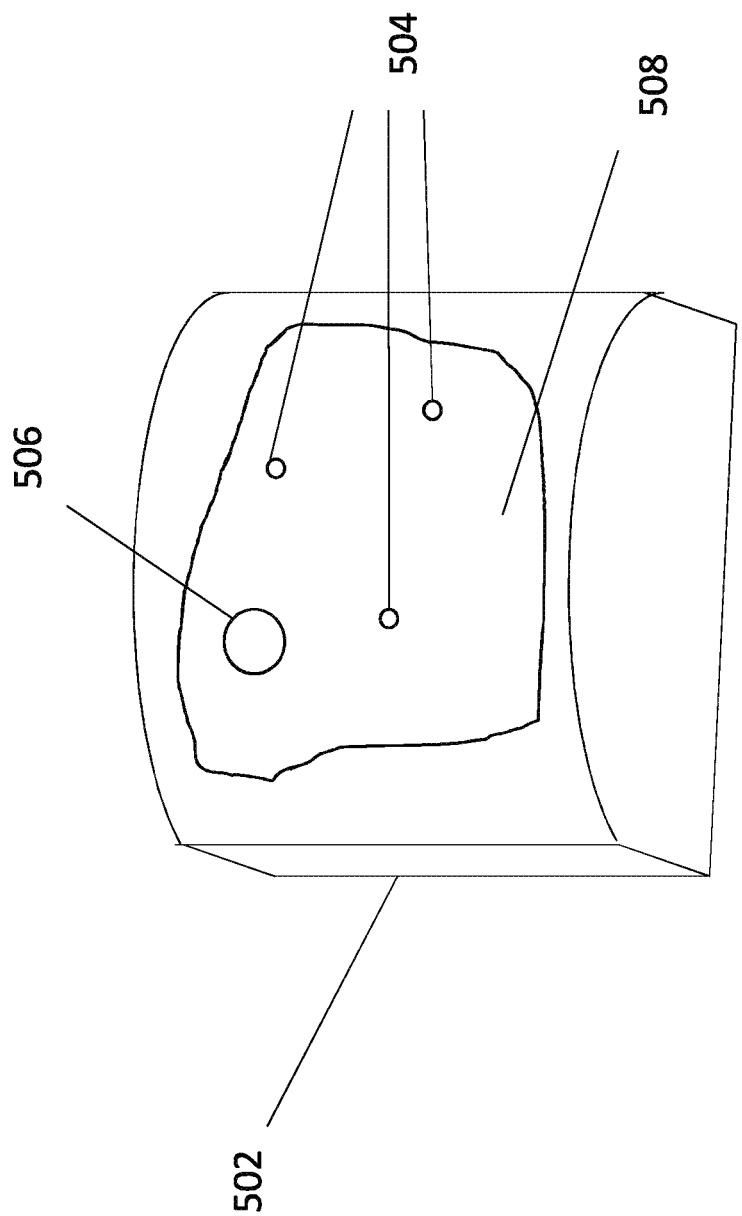
FIG. 5A shows a lower part of a mould tool for use in a method according to an embodiment of the present disclosure.

The next stage according to the method of the present disclosure is to load the flexible or inflexible network into a large mould tool 500. The large mould tool may also be referred to as a second mould tool. FIG. 5A shows a lower mould part 502 of the large mould tool 500. Lower mould part 502 comprises three recesses 504, each configured to receive and fix the location of one of the nodal points of the flexible network 400. The lower mould tool also has a complex three-dimensional surface 508 including at least one other feature 506. It will be understood that the three-dimensional surface 508 defines a surface of the final part, and that the surface may include several features in addition to the one feature 506. As will be well understood by the skilled person, such features may be provided to locally strengthen the part, to provide attachment points via which the part may be attached to another part, or for various other reasons.

Figure 5B:
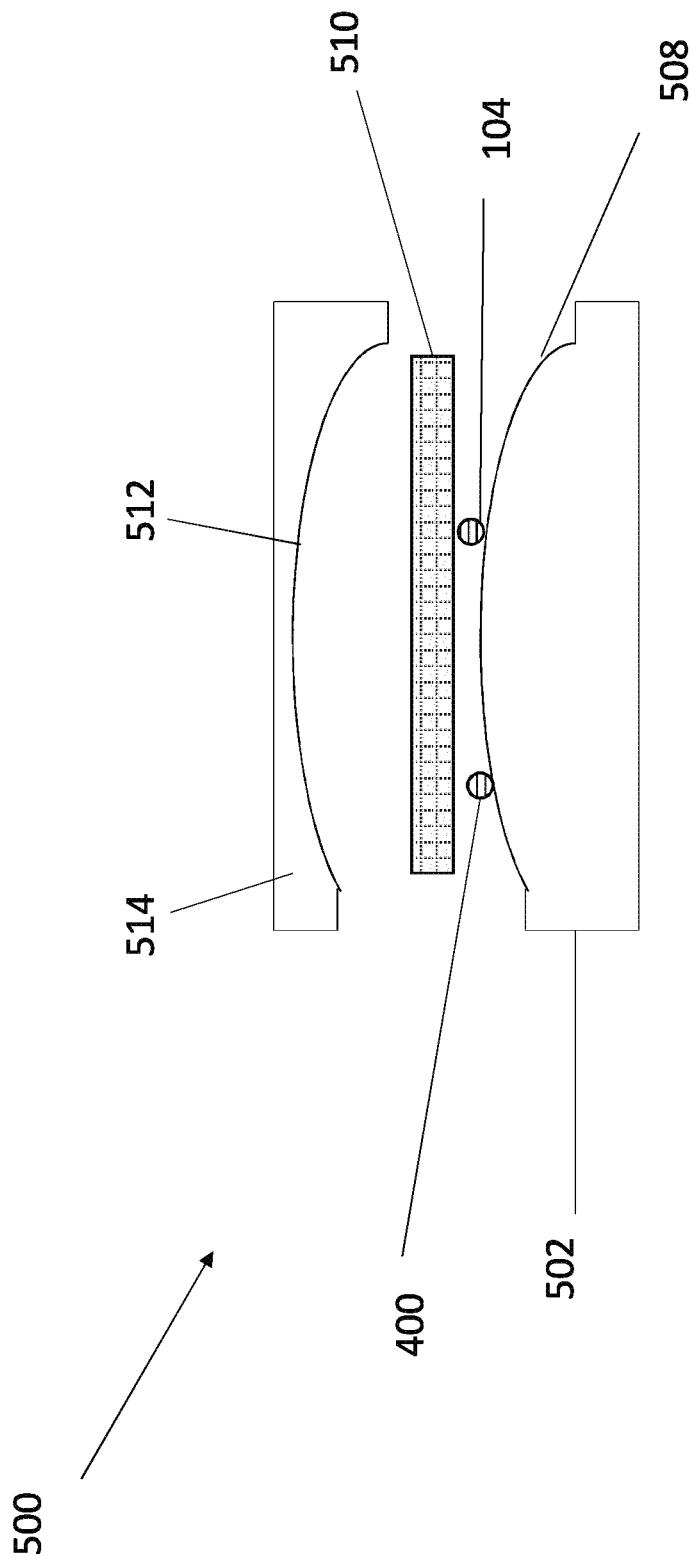
FIG. 5B shows a cross section through an open mould tool including the lower part shown in FIG. 5A.

FIG. 5B shows a cross section through a mould tool 500 comprising a lower part 502 as illustrated in FIG. 5A, and a corresponding upper part 514. The flexible network 400 shown in FIG. 4 is placed into the open mould, with the nodal points 406 inserted into the corresponding recesses 504, thereby fixing the position of the flexible network 400 within the mould tool 500. In the cross-section shown in FIG. 4, only the unidirectional fibres 104 of the flexible network 400 are visible, but it will be understood that the nodal points 406 are inserted into the corresponding recesses 504.

The spacing of the recesses 504 is selected so as to ensure that when the nodal points 406 are inserted into the recesses, the UDs 104 are held slightly in tension. This ensures that the UDs follow the intended paths between the nodal points and along the surface of the lower mould part 502, and that the flow of material when the mould is closed does not force the fibres away from their intended paths. In some embodiments, it may be necessary to provide an additional means of fixing the position of the unidirectional fibres 104 within the mould tool. For example, one or more of the UDs 104 may end at a position that is intended to be outside the finished part. In that case, it may be feasible for the end of the UD to extend beyond the complex three-dimensional surface of the lower mould part 502, and the end may be constrained in a recess or other feature to ensure that the UD 104 follows the required path during moulding. The protruding UD may then be cut off the part after the final moulding step.

A charge of sheet moulding compound 510 is also placed into the open mould above the flexible network. As discussed above, sheet moulding compound comprises a thermoset material having a plurality of short, randomly-distributed fibres embedded therein. Both the upper part 504 and the lower part 502 are provided with embedded heating elements, so that the mould parts may be heated to a sufficiently high temperature to render the sheet moulding compound 510 flowable.

Once the flexible network 400 and the charge of material 510 is inserted into the open mould 500, the upper and lower mould parts 502, 504 are heated and pressed together, so as to over-mould the flexible network 400 with the sheet moulding compound 510. It will be understood that the amount of sheet moulding compound 510 is selected so as to ensure that the sheet moulding compound substantially fills the mould tool 500 when it is closed, so that the surfaces 508, 512 define the surface of the finished part. Furthermore, because the nodal points 406 are located within recesses in the lower mould part 502, the unidirectional fibres 104 of the flexible network 400 are retained in their intended positions between the nodal points. It will be understood that the pressure within the mould tool acts to retain the nodal points 406 within the recesses 504. It will be understood that, because the matrix material of the SMC used in the initial moulding of the nodal points 406 is a thermoset polymer, it does not re-melt in the large mould tool 500, so the nodal points 406 are retained within the recesses 504, and the UDs 104 cannot escape from the nodal points during the second moulding step. For some shapes of component it may be necessary to supplement the restraining action of the nodal points with grooves into which the UDs fit, the action of the grooves and nodal point restraint acting together to very effectively prevent deflection or displacement of the network during moulding.

The unidirectional fibres 406 provide a significant increase in the tensile stiffness and strength of the part along the paths that the unidirectional fibres follow. This allows a part to be designed having high tensile strength and stiffness in the regions where this is required, without the need to either use an expensive material for the entire part, or to use a large amount of a relatively low-cost but heavy material. Accordingly, the present disclosure allows parts having improved properties in terms of the available combination of strength, stiffness, weight and cost.

Figure 6:
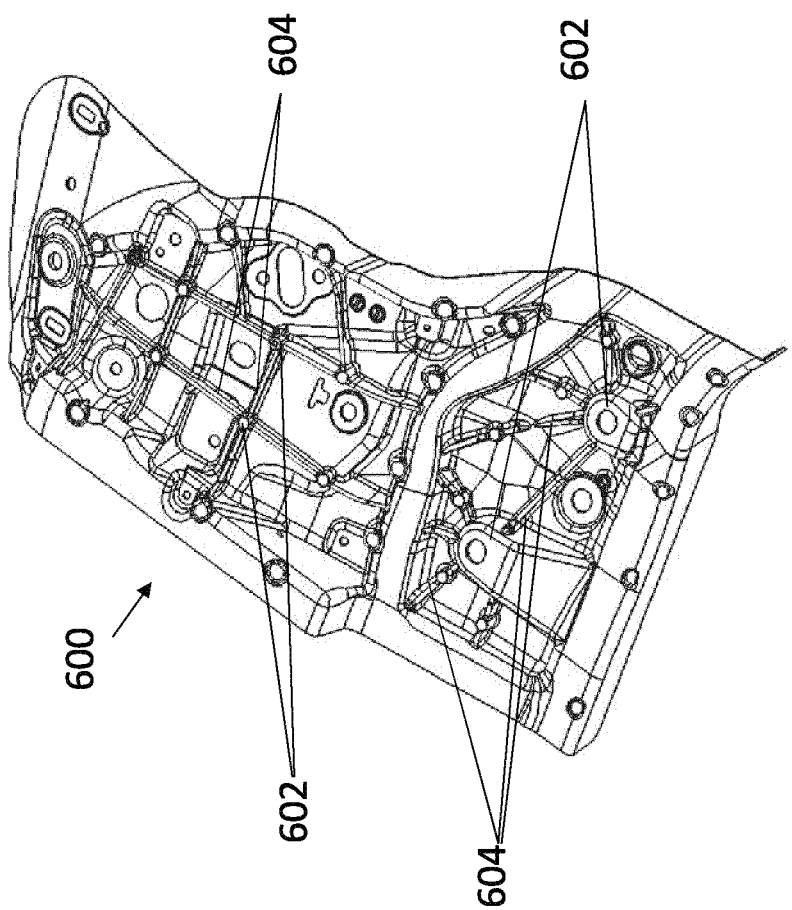
FIG. 6 shows a component for an automobile produced according to an embodiment of the present disclosure.
Figure 7:
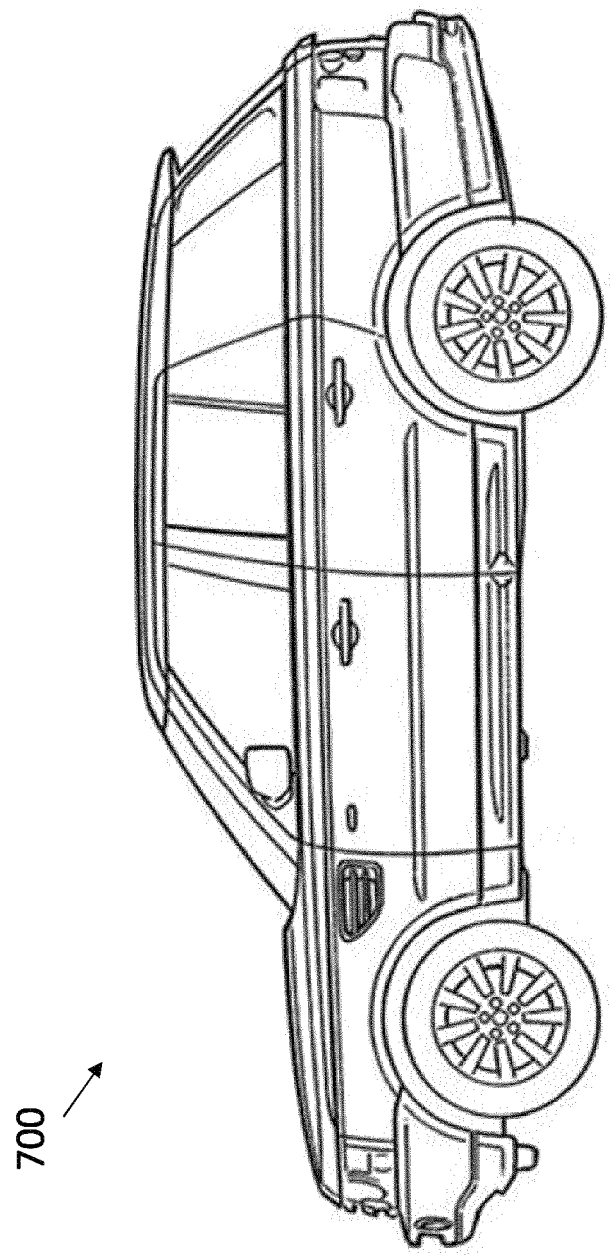
FIG. 7 shows a vehicle including a component produced according to an embodiment of the present disclosure.

FIG. 6 shows a wheel arch inner member 600 for an automobile produced according to the method of the present disclosure, and FIG. 7 shows a vehicle 700 into which a component according to one or more embodiments of the present disclosure may be incorporated. As can be seen from FIG. 6, the component has a complex surface having various features. It can be seen that protrusions at various nodal points 602, and that the fibres 604 joining the nodal points cause elongate protrusions on surface of the component 600. It will be understood that in other embodiments, different materials may be over-moulded around the flexible network 400. The material that is over-moulded around the network of unidirectional fibres 400 may be referred to as a "second moulding material".

The component illustrated in FIG. 6 is a wheelarch inner member, but it will be understood that the method of the present disclosure could be used to make various different vehicle components. For example, and without limitation, the present disclosure may be used to make any internal panels of a vehicle, components of a body shell, parts of a battery casing, parts of a vehicle sub-frame or parts of a vehicle seat. In general, the present disclosure may be applied to the manufacture of parts having a largest dimension of up to 600 mm, although it will be understood that it could also be used to make larger components.

Although the method described above employed a resin from layers of prepreg material and a thermoset from the SMC to produce the nodal points 406 around the unidirectional fibres, it will be understood that various other polymers could be used for this purpose. Furthermore, the nodal points need not necessarily be made from a polymer. For example, in some embodiments the nodal points may be produced by placing the overlapping and/or end parts of the UDs within a mould and casting a metal around the UDs so as to form the nodal points. Casting of a metal around the UDs to form the nodal points may provide increased strength at the nodal points, although it may also increase the cost and weight of parts produced according to the present disclosure.

All of the features disclosed in this and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

The invention claimed is:

1. A method of manufacturing a moulded component having at least two unidirectional fibre portions, said method comprising:
   positioning the at least two unidirectional fibre portions in a network in a jig, wherein said jig is configured to secure the at least two unidirectional fibre portions in a predetermined position such that the at least two unidirectional fibre portions meet or intersect at one or more nodal points;
   over-moulding a first moulding material over the at least two unidirectional fibre portions at the one or more nodal points, thereby forming a network of unidirectional fibres having over-moulded nodal points;
   positioning the network of unidirectional fibres having over-moulded nodal points into a mould tool such that the over-moulded nodal points are located at predetermined locations within the mould tool, wherein said mould tool has at least one recess arranged to receive one of said over-moulded nodal points, thereby to constrain the over-moulded nodal points within the mould tool;
   introducing a second moulding material into the mould tool, wherein the second moulding material comprises a sheet moulding compound, the sheet moulding compound comprising a thermoset material having a plurality of short, randomly-distributed fibres embedded therein; and
   over-moulding the network of unidirectional fibres having over-moulded nodal points with the second moulding material to form the moulded component.

2. The method of claim 1, wherein the moulded component is a component for an automobile, and
   wherein the component comprises an internal panel of an automobile, a component of a body shell of an automobile, a part of a battery casing of an automobile, a parts of an automobile sub-frame or a part of an automobile seat.

3. The method of claim 1, wherein each of the at least two unidirectional fibre portions comprises a plurality of intertwined continuous fibres.

4. The method of claim 1, wherein the first moulding material comprises a plurality of embedded fibres.

5. The method of claim 4, wherein the first moulding material comprises embedded aligned fibres arranged in a plurality of different directions.

6. The method of claim 5, wherein the embedded aligned fibres are arranged in a cross-weave pattern.

7. The method of claim 4, wherein the plurality of embedded fibres are aligned in at least four different directions, such that a strength and/or a stiffness of the first moulding material is quasi-isotropic in at least one plane.

8. The method of claim 7, wherein the plurality of embedded fibres are orientated parallel to four principal axes within a single plane, each of said axes being inclined at an angle of approximately 45 degrees to at least one other axis.

9. The method of claim 1, wherein the first moulding material is provided in the form of one or more disks.

10. The method of claim 9, wherein a plurality of disks are provided, and each disk has a plurality of aligned fibres embedded therein, and wherein a direction of the aligned fibres in each disk is offset from a direction of the aligned fibres in at least one other disk.

11. The method of claim 1, wherein the second moulding material further comprises a metal or metal alloy, a matrix material containing glass fibres, or a mixture thereof.

* * * * *